INVENTOR.
MAURICE SAUVANET
BY Kurt Kelman
AGENT

INVENTOR.
MAURICE SAUVANET
By Kurt Kelman
agent

Dec. 22, 1964 M. SAUVANET 3,162,838

SYSTEMS FOR SWITCHING DEVICES FOR SEQUENTIALLY TRANSMITTED SIGNALS

Filed Sept. 19, 1962 3 Sheets-Sheet 3

INVENTOR.

MAURICE SAUVANET by Kurt Kelman

Agent

United States Patent Office 3,162,838

Patented Dec. 22, 1964

3,162,838

SYSTEMS FOR SWITCHING DEVICES FOR SEQUENTIALLY TRANSMITTED SIGNALS

Maurice Sauvanet, Levallois-Perret, France, assignor to Compagnie Francaise de Television, a corporation of France Filed Sept. 19, 1962, Ser. No. 224,686

Claims priority, application France, Sept. 22, 1961, 873,895

6 Claims. (Cl. 340—147)

The present invention relates to system for switching $n$ information signals E1, E2 . . . E$n$ which are sequentially transmitted within time intervals of a duration T and at frequency $F=1/nT$, at least one of these signals being preceded by an identification signal. More particularly, the invention relates to such systems, where the switching device comprises $n$ inputs, the first of which receives the incoming sequential signals, and the $(n-1)$ others receive the same signals respectively delayed by T, 2T . . . $(n-1)$T, and $n$ outputs, each of which is assigned to one signal E$i$, i.e., receives the non delayed signal E$i$ and the corresponding $(n-1)$ delayed signals.

Such is the case, in particular, in the SECAM colour television system, wherein two colour information signals are transmitted alternately according to a line-sequential pattern by means of a subcarrier and are repeated, before or after detection, in order to provide permanent information in the receiver. In an embodiment of this system, at least one of the two signals E1=A and E2=B, is preceded by an identification signal S.

In this case, the switching system may be actuated, for example, by a multivibrator which is triggered by the identification signals, or by pulses derived therefrom, these identification signals being first separated according to their position, and/or their structure, and detected if required.

However, such a system is liable to be triggered by some noise signal, which occasionally may have a structure which is about the same as that of the identification signals.

The invention has for its object to provide a switching system, which is immune of this drawback and the operation of which is particularly reliable. More particularly, it is one object of the invention to provide a system of this type which makes use of the repetition of the identification signals (which repetition is automatically brought about at the same time as that of the information signals) for detecting and correcting wrong switching.

The object of the invention is thus a switching controlling system for a switching system of the type comprising: a switching device, a switching signal generator system having $n$ possible states, where $n$ is an integer, said switching signal generator system being coupled to said switching device, and $n$ output channels; said switching device having a first input for receiving sequences of $n$ information signals E1, E2 . . . E$n$, each of said information signals being applied thereto within time intervals having the same duration T and occurring with the frequency $1/nT$, each of said sequences further comprising at least one identification signal preceding one of said information signals; said switching device having $(n-1)$ other inputs for receiving said sequences respectively delayed by T, 2T . . . $(n-1)$T, and $n$ outputs respectively coupled to said $n$ output channels for feeding each of said output channels with a different one E$i$ of said information signals; said switching controlling system including means coupled to a selected one of said channels for collecting among the signals propagating in said selected channel a reference signal which is constituted by at least a predetermined portion of said identification signal, said reference signal appearing with the period T in said selected channel if said switching device operates correctly; and controlling means coupled to said collecting means and to said switching signal generator system for causing said signal generator system to be temporarily blocked in one of its states after said reference signal has failed to appear in said selected channel, and to be unblocked after said reference signal has again appeared in said selected channel.

This system presents the following main advantages over known systems:

A complete unsensitiveness to any noise signal superposed on the identification signal as soon as the switching is correct;

Immediate or rapid restoration of the correct switching after a wrong switching;

Since reference signals are separated after the switching, advantage may be taken of the gain and selectivity of the amplification channel of the main signals and, as the case may be, of the limiting, selecting and detecting devices which this channel may comprise, which may lead to circuits for collecting the signals concerned which are more simple than those which are required when the identification signals are separated before the switching.

The invention will be best understood from the following invention and appended drawings, wherein.

The invention will be described with reference to colour television, the two signals to be separated, say E1=A and E2=B, being two colour signals, which are alternately transmitted according to a line sequential pattern by means of a subcarrier which is suppressed in the absence of any signals, and the switching being effected in a colour television receiver. The switching may be effected at any stage of the receiver. In particular it may take place before or after the detection of the colour signals.

Figure 1:
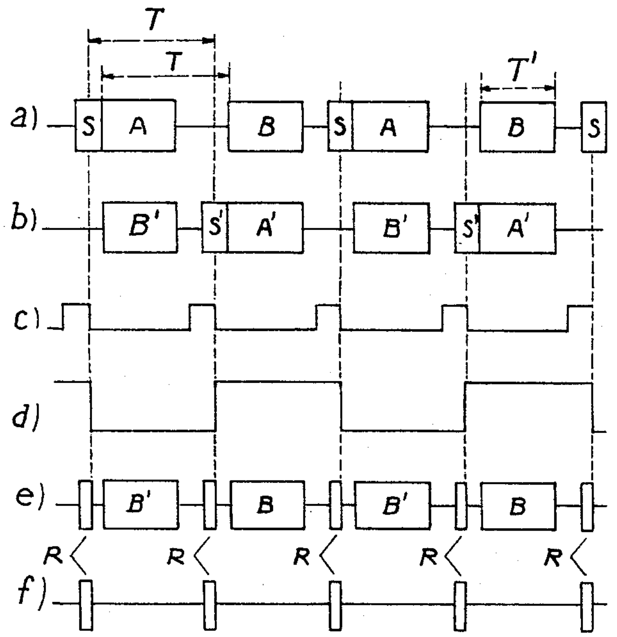
FIG. 1 shows graphs illustrating the principle of the invention.

The invention will be explained with particular reference to portions *a*, *b*, *d*, *e*, and *f* of FIG. 1, FIG. 1*c* being for the present disregarded. FIG. 1*a* shows the relative position in time of signals A and B. An identification signal S precedes signal A. The above mentioned interval T and the duration T′ of signals A and B, is also indicated. The duration of signal S, which is transmitted in the course of the line blanking periods separating a signal A from a signal B is greatly exaggerated in the figure and that of the blanking periods as well.

FIG. 1*b* shows the train of signals of FIG. 1*a*, delayed by time T, the delayed signals corresponding to A, B, and S being designated by A′, B′ and S′, respectively.

According to the known art, the signal of FIG. 1*a* and those of FIG. 1*b*, which will be called "direct" and "delayed" signals, are respectively applied, to the two inputs of a switch having two inputs and two outputs.

This switch is controlled by at least one square signal $d$ of a period 2T shown in FIG. 1*d*, delivered by a generator which may be controlled in different ways, and which is actuated in the course of the line blanking periods. The switch is controlled in such a manner that, for a given level of signal $d$, the signals which are not delayed are directed towards one output thereof and the delayed signals towards its other output while for the other level of signal $d$, the reverse takes place. Each of said levels lasts a time T.

It was assumed in FIG. 1 that the switching of signal sequences of FIGS. 1*a* and 1*b* takes place during the time intervals covered by signals S. Under such conditions, there is normally obtained at that output of the switch feeding channel B, the signals represented in FIG. 1*e*, i.e. signals B followed by the initial portion of the signals S and signals B′ followed by the initial portion of signal S′. These first portions of signals S and S′, which will both be designated by R, have a period T. The other output channel of the switch, i.e. channel A, normally receives signals A and A′ which are respectively preceded by those final portions of signals S and S′ which have not been lost during the switching. Whatever the manner in which signal sequences of FIGS. 1*a* and 1*b* are chopped during the line blanking periods, there will always be found on at least one of the output channels of the switch, if the latter operates correctly, a periodic signal R built up by the whole or by a predetermined portion of the identification signal and which may serve as a reference signal.

Assuming, for example, that channel B is chosen as the checked channel, it may be readily seen from FIG. 1 that if, as a consequence of a wrong switching, a direct signal A or a delayed A′ has been switched into channel B, this will result in the absence of a signal R after this signal.

According to a preferred embodiment of the invention, signals R are collected from channel B. The series of these signals R, which are shown in FIG. 1*f*, is used in such a way that the absence of a signal R blocks the generator of the switching signals until a signal R is again present in the corresponding channel.

Figure 2:
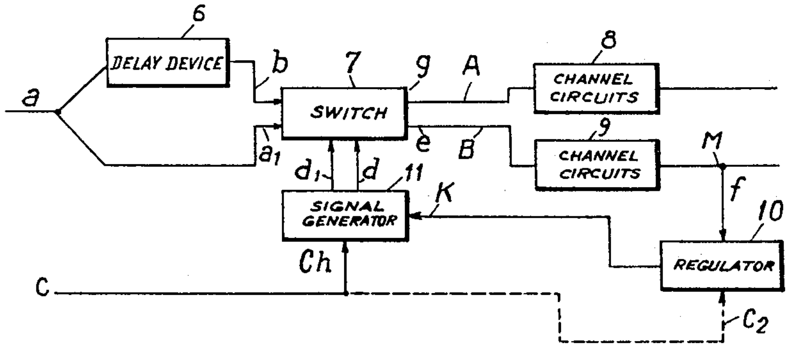
FIG. 2 is a block diagram of one embodiment of a system according to the invention.

FIG. 2 is a block diagram of an embodiment of the system used to this effect.

In FIG. 2, the input *a* is that to which are applied the direct signals shown in FIG. 1*a*. Input *a* is directly connected to a first input *a*1 of a switch 7 and, through a delay device 6 imparting a delay equal to T, to a second input *b* thereof.

The delay device 6 may be, for example, one using an ultrasonic line.

The signals applied to the inputs *a*1 and *b* are thus respectively the direct signal of FIG. 1*a* and the delayed signals of FIG. 1*b*.

Switch 7 comprises, in addition, two control inputs *d* and *d*1. The signal applied to input *d* is the signal of FIG. 1*d* and the signal to input *d*1 is the same signal in phase opposition with signal *d*. These signals are delivered by the generator of switching signals 11, which is in turn controlled by pulses *c*, shown in FIG. 1*c*, which are applied to input C*h* of generator 11. This generator may be, for example, a bistable multivibrator or a relaxation oscillator having a natural relaxation period longer than 2T and the changes of state of which are accelerated by pulses *c*. Pulses *c* are derived according to known techniques from the transmitted line synchronization pulses or from the line-retrace pulses appearing normally in the scanning circuits of the receiver during the line blanking periods. They are applied to an input *c* of the system, said input *c* being connected to input C*h* of generator 11.

In the present example, the phase of pulses *c* is selected in such a manner that at least a portion of a pulse *c* and a portion of a signal S or S′, occurring during the same line blanking period, coincide in time. This requirement is, however, essentially only in the case, where, as indicated below, those same pulses *c* are used for selecting pulses R.

In the present example, generator 11 is adjusted so that its triggering coincides with the trailing edge of pulses *c*, although this is not essential.

Switch 7 comprises two outputs *g* and *e*, to which the above mentioned channels A and B are respectively coupled. At the output *e* of the switch will thus normally appear the signals shown in FIG. 1*e*. A checking and controlling circuit 10, called for short a regulator, has its input *f* coupled to channel B at a point M thereof. Channel B may include different circuits between output *e* and point M, and channel A the corresponding circuits 8. Circuit 10 may also be immediately coupled to output *e*, although it is more advantageous to couple it to channel B, after, for example, an amplification and an amplitude limitation have taken place.

Circuit 10 may be controlled by pulses *c*, which are applied to its input *c*2, connected to input *c*, in such a manner that only those signals in channel B may be collected which coincide in time with pulses *c*, i.e. signals R of FIG. 1*f*. This synchronization of circuit 10 by pulses *c* is not necessary if pulses R may be separated by circuit 10 without any gating. Such is the case, for example, if the input signals of the switch are detected signals and the identification signals have such a high positive or negative level that it is possible to select them by means of a thereshold device. This is why input *c*2 is shown in dotted lines.

Circuit 10 has such a structure and is coupled to an input K of generator 11 in such a manner that the latter is normally tripped for each pulse *c*, as long as signal R is normally collected, with a period T, by circuit 10. In the opposite case, i.e. in the case of a wrong switching, generator 11 is rapidly prevented from triggering until the appearance of a new pulse R in channel B, which occurs as soon as a signal B or B′ has appeared at that input of the switch, which is connected to channel B in the blocked state of generator 11.

Figure 3:
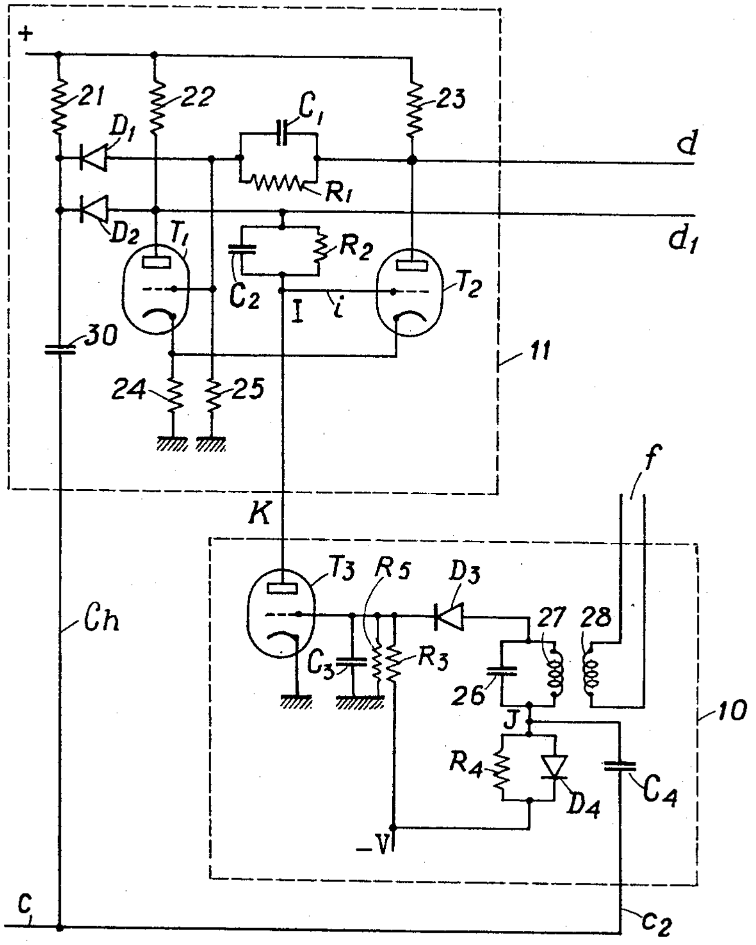
FIG. 3 shows in more detail a portion of FIG. 2.

FIG. 3 illustrates an embodiment of circuit 10 and its coupling to a bistable multivibrator 11, of a generally conventional type, modified to make the above described blocking possible.

It is assumed, in this example, that at point M the identification signals S, and, consequently, signals R, are built up by trains of oscillations of a characteristics frequency F. The value of the latter depends on the stage at which signals R are collected. This may be done, for example, at the intermediate frequency or at the frequency of the subcarrier.

It is also assumed that the transmission is effected with the subcarrier being suppressed in the absence of any signals.

In FIG. 3, circuit 10 comprises an input *f*, connected to point M in the channel B of FIG. 2, this input *f* consisting of a two-wire circuit terminating in a winding 28 which is inductively coupled to a circuit comprising a winding 27 and a capacitor 26 in parallel. Circuit 26–27 is tuned to frequency F. One of the terminals of this circuit is connected to the anode of a diode D3, the cathode of which is connected: firstly to the grid of a triode T3, secondly to ground, through a capacitor C3 and a resistance R5, and finally to a source of negative voltage −V, through a resistor R3. The same source is also connected to one terminal of a circuit comprising in parallel a resistance R4 and a diode D4. The second terminal of this circuit is connected at J to the other terminal of the parallel circuit 26–27.

The input *c*2 of system 10 is connected to terminal J through a capacitor C4.

The cathode of triode T3 is grounded and its plate connected through conductor K, in a manner to be described, to a bistable multivibrator 11.

Multivibrator 11 is of a known type, except that it is slightly modified for the purpose of the invention, as will be shown in the following. It comprises two triodes T1 and T2, their cathodes being grounded through a common cathode resistance 24. The plates of these triodes are respectively connected to a source of positive voltage by resistances 22 and 23. To the same source is also connected, through a resistor 21, one terminal of a capacitor 30, the other terminal of which is the input C*h* of the multivibrator. Diodes D1 and D2 have their cathodes connected to the terminal common to resistance 21 and capacitor 30. The anode of diode D1 is connected directly to the grid of triode T1 and, through a circuit comprising a resistor R1 and a capacitor C1 in parallel, to the plate of tube T2. A circuit, comprising in parallel a resistor R2 and a capacitor C2 has one terminal connected to the anode of diode D2 and its other terminal I connected to the grid of T2. The anode of diode D2 is further directly connected to the plate of T1. The grid of tube T1 is grounded through a resistance 25. The outputs *d* and *d1* of the multivibrator are respectively connected to the plates of tubes T2 and T1. Generally such multivibrators also comprise a connection of terminal I to ground through a resistance which causes, due to the current flowing through resistance R2, a voltage drop between the plate of tube T1 and the grid of tube T2. The multivibrator is then normally triggered by each pulse applied to input C*h*.

In the present case, and this is the only respect in which the multivibrator considered differs from the conventional multivibrators of this type, terminal I is connected to the plate of triode T3 by a lead K and is thus grounded through tube T3 only if the latter is conducting.

The operation of this device will be explained with reference to FIG. 1.

The positive pulses *c*, shown in FIG. 1*c*, are applied, with the phase illustrated, to capacitor C4 shown in FIG. 3. This capacitor and the circuit comprising diode D4 and resistance R4 are designed so as to make the peaks of the corresponding pulses, appearing to terminal J, equal to potential —V (which is selected to be more negative than the cut-off potential of the grid of tube T3). Thus, diode D3 is always blocked except for the time intervals corresponding to the passage of pulses *c*. During those time intervals, the only signals which normally appear in channel B and are transmitted through winding 28 to the anode of diode D3, are the signals R at frequency F, the position of which in time is shown in FIG. 1*f*.

The pulses R are rectified by diode D3; at each passage of a pulse R, capacitor C3 charges very rapidly and between two passages of pulses R discharges slowly through resistances R3 and R5.

Resistance R5 is selected much higher than R3 and the values of the elements are selected such that the voltage V which appears on the grid of triode T3:

(*a*) Remains higher than the voltage value for which triode T3 is blocked as long as the capacitor is regularly charged and charged again by the pulses R of period T;

(*b*) Reaches this value soon after a pulse R has been missing; preferably this occurs within a time interval comprised between T and 2T after the passage of the last pulse R.

When the blocking level is reached, triode T3 is no longer conducting and the high positive voltage, then appearing on grid of triode T2, results, whatever the previously prevailing conditions and until capacitor C3 is charged again, in triode T2 being conductive and triode T1 being blocked. In this state of generator 11, signal *d* appearing on the plate of triode T2 is at its lower level and, consequently, as shown in FIG. 1 the delayed input channel of switch 7 shown in FIG. 2 is connected to channel B.

Under such condition, the device operates as follows:

At the starting, i.e. either when the receiver is first put into operation or after a trouble of any kind, capacitor C3 is normally discharged, i.e. channel B is connected to the delayed input channel. If a signal B′ is, at this instant, in the delayed channel, this signal will then pass correctly into channel B; it is followed by a pulse R which unblocks generator 11 which is therefore triggered into its other state by the trailing edge of the first pulse *c* following the passage of signal B′ and the operation will go on normally.

If, under the same conditions, a signal A′ is in the delayed channel, it will pass into channel B. Since signal A′ is not followed by a pulse R, capacitor C3 is not recharged, the pulse *c* which follows signal A′ has no effect on the multivibrator, which remains in the same state, i.e. a signal B′ passes into channel B. The conditions are again as in the previous case, and the operation goes on normally.

The highly improbable case where an erroneous switching takes place (due for example to the generator failing to trip) while the generator is not blocked, would again result in the absence of a signal R after the first erroneous information signal on channel B.

Under these conditions, the blocking level is rapidly reached. This takes place during the following line period, if the time constant of the device is selected as indicated. One is thus reverted to the case where the device starts operating with the generator blocked. It may be readily seen that in the most unfavourable case, the correct switching is restored after the passage of two erroneous information signals in channel B.

Figure 4:
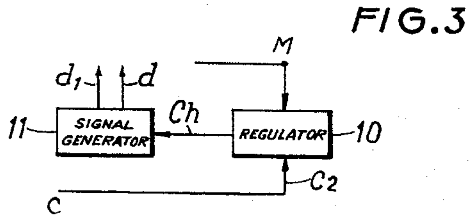
FIG. 4 is a modification of the circuit shown in FIG. 2.

The time constant of the circuit R3–C3 is rather critical. FIG. 4 illustrates an alternative embodiment which avoids any time constant, and wherein the reference signals directly trigger the switching signal generator.

FIG. 4 represents the regulator 10 and generator 11. This block diagram differs from that of FIG. 2 in that generator 11 does not receive any synchronization pulses *c* and in that its control input C*h* is connected to the output of regulator 10.

The remainder of the diagram is identical to that of FIG. 2; however, for a better protection against noise, it is now very desirable that the reference signal should be collected by means of a gating circuit, even if the identification signals can be separated from the information signals on account of their very nature. To this end, regulator 10 this time normally includes the gating circuit which could, in some cases, be dispensed with in the case of FIG. 2, this gating or coincidence circuit being unblocked by pulses *c* which may be derived in the same way as the pulses *c* in the embodiment of FIG. 2.

The first input of this gating circuit is the input *c2* of regulator 10, connected to the input *c* to which pulses *c* are applied.

The second input of this gating circuit is coupled to the checked channel, this coupling being advantageously effected in any case through a circuit selective with respect to the nature of the identification signals. Regulator 10 may also include a detector at the output of the gating circuit.

The phase and duration of pulses *c* must of course be selected in such a manner that there should be at least a partial coincidence in time between pulses *c* and signals S.

The reference signal then begins with the beginning of the coincidence, i.e. with the beginning of pulses *c* if those appear later than the identification signals, and with the beginning of the identification signals if pulses *c* appear before them.

The checked channel is of course that in which the beginning of the reference signal normally appears and, as the triggering of the switching signal generator is directly controlled by the reference signal, the checked channel is then here necessarily the channel in which the information signal appearing normally is that which is followed, and not preceded, by the identification signal, in other words channel B.

The switching controlled by the reference signal through signal generator 11 will normally mark the end of the reference signal, since after this switching has taken place, the identification signal is no longer present in channel B. Thus the end of the reference signal normally coincides with the switching which it controls.

FIG. 1, which may be used to follow the operation of the device of FIG. 4 as well as that of FIG. 2 corresponds to pulses *c* beginning before signals S and ending before them.

At the starting, generator 11 is in either of its two states and the first information signal received through channel B is either a correct information signal B or B′, or an erroneous signal A or A′.

In the first case, the correct information signal is followed by an identification signal S which is picked up by regulator 11 during the time interval where there is coincidence between signal S and pulse *c*, and is applied to the control input *Ch* of generator 11 so that this triggers at the end of the collected pulse, which therefore constitutes the reference signal.

The generator, having tripped, will receive a second correct signal, consequently followed by a second identification signal and the cycle goes on indefinitely.

If, at the starting, the information signal received by channel B is not correct, this will result in the absence of a signal S or S′ following the information signal. Generator 11 will not be triggered and channel B, which remains coupled to the same input channel, will, this time, receive a correct signal. One is thus reverted to the preceding case.

The same will happen if a wrong switching occurs in the course of the operation. Any wrong switching will leave, during the following line period, channel B coupled to the same input channel of the switch and accordingly channel B will then receive the correct signal followed by an identification signal.

Figure 5:
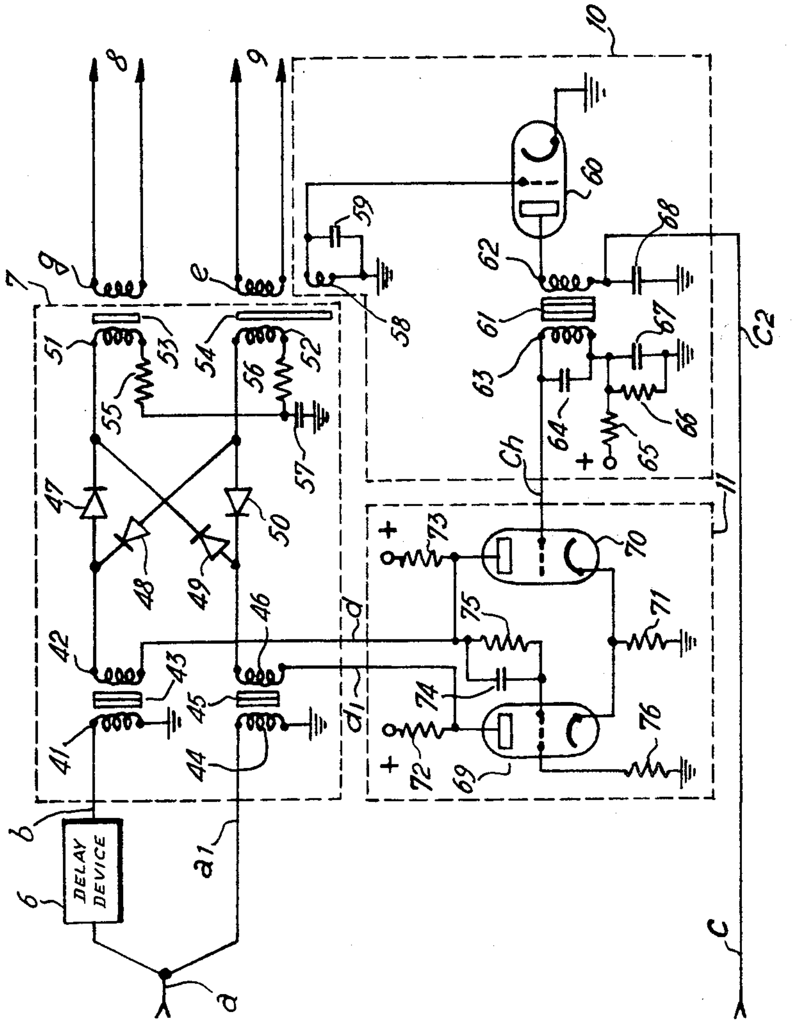
FIG. 5 shows in more detail a circuit of the type shown in FIG. 4.

FIG. 5 is a detailed diagram of an arrangement corresponding to this modified embodiment. It will be again assumed in this example that signal S, and consequently signals R, are formed by trains of oscillations of frequency F, this frequency being comprised in the spectrum of the information signals as already mentioned, the subcarrier is suppressed in the absence of signals.

In this figure, *a*, *a*1, 6, 7, *b*, *c*, *g*, 10, 11, *c*, *Ch* and *c*2 indicate the same elements as in FIG. 2. By way of example, a switch 7 has been illustrated, the inputs *a*1 and *b* of which are respectively followed by primary windings 41 and 44 of transformer 43 and 45. First terminals of secondary windings 42 and 46 of these transformers are respectively connected to the control inputs *d* and *d*1 of switch 7, whereas their second terminals built up two apices of a diode bridge.

The anode of a diode 47 and the cathode of a diode 48 are connected to the second terminal of the secondary winding 42; the anode of a diode 49 and the cathode of a diode 50 are connected to the second terminal of the secondary winding 46. The cathodes of diodes 47 and 49 are connected to the first terminal of the primary winding 51 of a transformer 53, the second terminal of which is connected to the first terminal of a resistance 55, whose second terminal is grounded through a capacitor 57.

The anodes of diodes 48 and 50 connected to a first terminal of the primary winding 52 of a transformer 54, the other terminal of the winding being connected, through a resistance 56, to that terminal of capacitor 57 which is not grounded. The secondary winding *g* of transformer 51 and a secondary winding *e* of transformer 54 are the outputs of the switch and feed respectively channels A and B.

Transformer 54 comprises another secondary winding 58 which serves as the inductance coil of a parallel resonant circuit tuned to frequency F and also comprising a capacitor 59.

The parallel circuit 58–59 builds up the input of device 10 which will now be described. This circuit has one terminal grounded and its other terminal connected to the grid of a triode 60.

The cathode of triode 60 is grounded and its plate is connected to one terminal of the primary winding 62 of a transformer 61, the other terminal of this primary winding being connected to ground, through a capacitor 68, and to input *c*2 of regulator 10. The secondary winding 63 of transformer 61 is the inductance coil of a parallel resonant circuit 63–64, which is tuned to frequency F and also comprises a capacitor 64. The parallel circuit 63–64 has a terminal in common with a parallel circuit comprising a capacitor 67 and a resistance 66, the other terminal of the parallel circuit 66–67 being grounded. The terminal common to circuits 63–64 and 66–67 is connected, through a resistance 65, to a source of positive voltage.

The terminal of the parallel circuit 63–64, which is not common to it and to circuit 66–67, is connected, by lead *Ch*, forming the input of generator 11, to the grid of a triode 70 forming part of this generator.

Generator 11 is a cathode coupled bistable multivibrator, with a single input, of a known type, which is tripped by A.C. pulses of a sufficient level. It comprises two triodes 69 and 70, which have their cathodes grounded through a common resistance 71 and the plates of which are connected to a positive voltage source by resistances 72 and 73, respectively. The grid of triode 69 is grounded through a resistance 76 and is connected to the plate of triode 70 by a circuit comprising in parallel a capacitor 74 and a resistance 75. The outputs are derived from the plates of triodes 69 and 70 and connected respectively to the inputs *d*1 and *d* of switch 7.

In this system, which operates according to the principle set forth in connection with the description of FIG. 4, the positive pulses *c* which are applied to the input *c*2, unblock triode 60 through raising the potential of its plate, only while pulses *c* are passing. Pulses R appearing during these intervals of time on channel B are collected by means of the resonant circuit 58–59 and applied to the grid of triode 60. The amplified pulses R, collected between the terminals of winding 62, are transmitted by induction to the resonant circuit 63–64 and therefrom to the grid of triode 70, which is positively biased at a suitable level by the biasing bridge 65–66, the capacitor 67 being a by-pass capacitor. Each pulse R therefore trips generator 11.

When triode 69 conducts and triode 70 is blocked, diodes 50 and 47 of switch 7 are conductive; in the opposite case, diodes 49 and 48 are conductive.

The input signals of the direct channel which are passed by induction to the secondary winding 46 of transformer 45 are, in the first case, passed to the secondary winding 52 of transformer 54 and therefrom to the output winding *e*; in the second case, the signals of the direct channel are passed to the primary winding 51 of transformer 53 and hence to the output winding *g*. It is readily seen that, by a similar process, the signals of the delayed channel are passed to the output *e* when the output signals of the direct channel pass to the output *g* and vice versa.

Resistances 55 and 56, which are connected in series with the primary windings 51 and 52, prevent any short-circuit at video frequency between the two plates of the generator 11. Capacitor 57 is a by-pass capacitor.

It will be noted that the presence, in the checked channel, of a major noise signal, acts as a control signal if pulses *c* are being applied, and does not modify the correct operation of the switch. As soon as the device operates correctly, its operation continues in such a manner as to direct signals B and B′ into channel B, as long as these signals are followed by pulses S, whether there is any noise signal or not.

In the system described it was assumed that the sequential signals were transmitted with an identification signal before one of the colour signals only. It is also possible to have two different identification signals, say S preceding A and U preceding B.

Signals S and U being different by definition, it is possible to disregard one thereof, to select a splitting of the switch input signals resulting in the occurrence, in the checked channel, of a signal R consisting, for example, of all or part of signal S and of the corresponding delayed signal S′. This signal R is then separated by means of a selective device, which is responsive to the structure of the signals S and U, so as to accept the one and reject the other, it being possible to duplicate this device, as in the above considered cases, by a device responsive to time. This brings the case back to a case with a single identification signal.

It should, however, be noted that, when two identification signals are used, signals S and U normally have the same position in time with respect to the information signals and that, in certain cases, if, signals S and U are formed, for example, by trains of oscillations with respective frequencies F1 and F2, the presence of a signal U in the checked channel instead of a signal R, gives a better protection than merely the absence of the signal R.

It would of course be possible to add to the described circuit circuits also using the second identification signal for controlling generator 11.

The invention is, of course, not limited to the embodiments described and illustrated which are given by way of example only.

In particular, when the number of sequential signals transmitted is higher than two, it is always possible to select for the checked channel a channel through which an identification signal, transmitted with a period $n$T, will normally propagate with a period T through the repetition of the input signals and their correct switching, and to cause the switching signal generator system to be temporarily blocked after this reference signal has failed to appear, and to be unblocked after the reference signal has again appeared.

What is claimed is:

1. A switching controlling system for a switching system of the type comprising: a switching device, a switching signal generator system having $n$ possible states, where $n$ is an integer, said switching signal generator system being coupled to said switching device, and $n$ output channels; said switching device having a first input for receiving sequences of $n$ information signals E1, E2 . . . E$n$, each of said information signals being applied thereto within time intervals having the same duration T and occurring with the frequency $1/nT$, each of said sequences further comprising at least one identification signal preceding one of said information signals; said switching device having $(n-1)$ other inputs for receiving said sequences respectively delayed by T, 2T . . . $(n-1)$T, and $n$ outputs respectively coupled to said $n$ output channels for feeding each of said output channels with a different one E$i$ of said information signals; said switching controlling system including means coupled to a selected one of said channels for collecting among the signals propagating in said selected channel a reference signal which is constituted by at least a predetermined portion of said identification signal, said reference signal appearing with the period T in said selected channel if said switching device operates correctly, and controlling means coupled to said collecting means and to said switching signal generator system for causing said signal generator system to be temporarily blocked in one of its states after said reference signal has failed to appear in said selected channel, and to be unblocked after said reference signal has again appeared in said selected channel.

2. A switching controlling system for a switching system of the type comprising a switching device; a switching signal generator having two possible states, and coupled to said switching device; and two output channels; said switching device having a first input for receiving sequences of two information signals, each of said information signals being applied thereto within time intervals having the same duration T and occurring with the frequency $1/2T$; each of said sequences further comprising at least one identification signal preceding one of said information signals; said switching device having a second input for receiving said sequences delayed by T and two outputs respectively coupled to said two output channels for feeding each of said channels with a different one of said information signals; said controlling system comprising means for applying to said switching signal generator pulses at a repetition frequency equal to $1/T$, for triggering said generator at said frequency; means coupled to a selected one of said output channels for collecting among the signals propagating in said selected channel a reference signal which is constituted by at least a predetermined portion of said identification signal, said reference signal appearing with the period T in said selected channel if said switching device operates correctly; and controlling means fed with said collected reference signals and coupled to said signal generator for blocking it in one of its states after said reference signal has failed to appear in said selected channel, and for unblocking it when said reference signals again appear.

3. A controlling system for a switching system of the type comprising a switching device; a switching signal generator having two possible states, and coupled to said switching device; and a first and a second output channel; said switching device having a first input for receiving sequences of two information signals each of said information signals being applied thereto within time intervals having the same duration T and occurring with the frequency $1/2T$; each of said sequences further comprising at least one identification signal preceding one said information signal; said switching device having a second input for receiving said sequences respectively delayed by T, and two outputs respectively coupled to said output channels for feeding said first output channel with the information signal preceded by said idenification signal, and said second output channel with the information signal followed by said identification signal; said controlling system comprising gating means coupled to said second output channel; means for applying to said gating means gating pulses at the frequency $1/T$ and coinciding at least partially in time with said identification signal; and means for applying the output signals of said gating means to said signal generator to trigger said signal generator.

4. A controlling system for a switching system of the type comprising a switching device; a switching signal generator having two possible states, and coupled to said switching device; and a first and a second output channel; said switching device having a first input for receiving sequences of two information signals each of said information signals being applied thereto within time intervals having the same duration T and occurring with the frequency $1/2T$; each of said sequences further comprising at least one identification signal preceding one said information signal; said switching device having a second input for receiving said sequences respectively delayed by T, and two outputs respectively coupled to said output channels for feeding said first output channel with the information signal preceded by said identification signal, and said second output channel with the information signal followed by said identification signal; said controlling system comprising gating means coupled to said second output channel through a circuit which is selective with respect to the nature of said identification signal; means for applying to said gating means gating pulses at the frequency $1/T$ and coinciding at least partially in time with said identification signal; and means for applying the output signals of said gating means to said signal generator to trigger said signal generator.

5. A switching controlling system as claimed in claim 4 wherein each of identification signals being a train of oscillations at a predetermined frequency, said selective circuit is a circuit tuned to said frequency.

6. A switching controlling system for a switching system of the type comprising: a switching device, a switching signal generator system having two possible states, said switching signal generator system being coupled to said switching device, and two output channels; said switching device having a first input for receiving sequences of two information signals, each of said information signals being applied thereto within time intervals having the same duration T and occurring with the frequency $1/2T$, each of said sequences further comprising at least one identification signal preceding one of said information signals; said switching device having one other input for receiving said sequences delayed by T, and two outputs respectively coupled to said two output channels for feeding each of said output channels with a different one of said information signals; said switching controlling system including means coupled to a selected one of said channels for collecting among the signals propagating in said selected channel a reference signal which is constituted by at least a predetermined portion of said identification signal, said reference signal appearing with the period T in said selected channel if said switching device operates correctly, and controlling means coupled to said collecting means and to said switching signal generator system for causing said signal generator system to be temporarily blocked in one of its states after said reference signal has failed to appear in said selected channel, and to be unblocked after said reference signal has again appeared in said selected channel.

References Cited by the Examiner

UNITED STATES PATENTS

| | | | |
|---|---|---|---|
| 2,738,379 | 3/56 | James et al. | 178—5.4 |
| 2,975,234 | 3/61 | Le Blan | 179—15 |
| 3,040,132 | 6/62 | Wilhelm | 179—15 |
| 3,070,662 | 12/62 | Eilers | 179—15 |

OTHER REFERENCES

Publication: "Sequential Receivers For French Color TV System," by Chaste et al., "Electronics," May 6, 1960, pp. 57–60.

NEIL C. READ, *Primary Examiner.*